Jan. 26, 1965 M. M. SHARMA 3,167,720
POWER AMPLIFICATION MEANS
Filed Feb. 10, 1961 4 Sheets-Sheet 1

MADAN M. SHARMA
*INVENTOR.*
BY Norman L. Chalfin
Agent

POWER AMPLIFICATION MEANS

Filed Feb. 10, 1961 4 Sheets-Sheet 2

MADAN M. SHARMA
*INVENTOR.*
BY Norman L. Chalfin
Agent

MADAN M. SHARMA
*INVENTOR.*

BY Norman L. Chalfin
Agent

MADAN M. SHARMA
*INVENTOR.*

BY Norman L. Chalfin
agent

United States Patent Office 3,167,720

Patented Jan. 26, 1965

3,167,720
POWER AMPLIFICATION MEANS

Madan M. Sharma, Los Angeles, Calif., assignor to Transis-Tronics, Inc., a corporation of California Filed Feb. 10, 1961, Ser. No. 88,348
2 Claims. (Cl. 330—10)

This invention relates to a novel means of achieving power amplification of low level signals and more particularly to means apparatus by which low-level signals of varying frequency in one frequency band are converted into relatively high power signals by causing the varying frequency signal to pulse-width modulate a single frequency signal of substantially higher frequency than that of the low-level signal.

Space and weight are prime factors in the requirements of instruments for use in airborne and space vehicles. Every cubic inch and every ounce by which space vehicle instruments are reduced add to the value of the instruments in these vehicles. It is therefore highly desirable to provide, among such instruments, means to achieve power amplification of electrical signals in instruments which can be efficient, lightweight and compact.

In the majority of instruments available for achieving higher power in the amplification of electrical signals, from direct current through any usable frequency range, much heavy equipment has in the past been required by virtue of the nature of the large and heavy components used therein. Vacuum tubes require filament and other power, necessitating sources of such power, and providing much unusable energy in the form of heat, not to speak of the excessive weight of such sources of filament and other power.

One of the objects of this invention is to provide compact and lightweight instrumentation for airborne and space vehicles which do not require such heavy sources of power. Transistors and other solid state devices are rapidly coming into use for amplification purposes but have heretofore been used largely in their modes of application which are analogous to electronic vacuum tubes.

One of the proper ties of transistors and many other solid state devices is that they can be made to operate in such a manner that the time duration of signals of otherwise constant amplitude applied to their input elements will produce a proportional output current, power conversion or a voltage output parameter corresponding to this time duration.

It is another object of this invention to make use of the above mentioned property of solid state devices in providing a method of generating such signals of varying time duration to make possible lightweight, compact instruments usable in airborne and space vehicles and on the ground.

In accordance with the invention, an amplitude and frequency varying low-level signal which may be for example, in the audio frequency range, but not limited thereto, will be applied to a solid state mixing device along with a single frequency oscillation from a range of frequencies several times higher in frequency than the highest frequency of the low-level signals. The single frequency signal will preferably be of a triangular waveform wherein the transition of each cycle of the wave, with respect to time, from the maximum above zero-level to the maximum below zero-level will be along a straight line at an angle, with an abrupt reversal in direction to the next succeeding waveform maximum of opposite polarity. Such a waveform when observed on an oscilloscope as a half-wave rectified signal would appear as a train of successive isoceles triangles with their bases on the zero line and each triangle separated by the length of its base from its succeeding and preceding triangles. Such waves, for the purposes of this invention, are to be preferred over sine waves. Saw-toothed waves are also among those which are useful in the implementation of this invention.

The modulating device as used in this invention causes the low-level signals to combine with the triangular-wave single-frequency signal in such fashion that the high frequency will appear superimposed on the low frequency and the bases of the triangular pulses resulting from the rectifying action of the modulating device will be proportional to the instantaneous amplitude of the low-level signal at the instant of occurrence of any one of the cycles of the triangular waveform. These triangular pulses are unidirectional and vary in amplitude without change of wave shape. The successive unidirectional triangular pulses are similar isosceles triangles of varying amplitudes, the variations in amplitude corresponding the low level signal waveform, the resulting unidirectional triangular pulses will therefore appear on an oscilloscope as a train of similar triangles rising from a reference base, the altitudes of the triangles varying in accordance with the low-level signals. The triangular pulses of varying amplitude and therefore varying base widths are then passed through an amplitude clipper device, or element which, so to speak, slices off the peaks of all of the triangular waves which exceed the triangle of least amplitude in the train. The level of the triangle of least amplitude should be capable of saturating the clipper. The end result is a signal of constant amplitude having unidirectional pulses each varying in duration in proportion to the concurrent instantaneous amplitude of the low level signal applied to the modulator. Each pulse, however, will be of a different duration depending upon the concurrent corresponding amplitude of the applied low level signals which may be, as in the example above, audio frequencies.

The duration of the constant amplitude unidirectional rectangular pulse is least at an instant in time when the concurrent applied low-level signal is most negative or of minimum amplitude. The duration and proximity of the constant amplitude unidirectional rectangular pulses are greatest when the voltage of the concurrent applied low-level signal is maximum, or most positive. The constant amplitude unidirectional pulse duration is least and the pulses separated most widely when the voltage of the concurrent applied low level signal is minimum or least negative.

Accordingly, the resulting signal from the clipping device is a train of unidirectional substantially rectangular pulses of constant amplitude and varying duration. The variations in duration being proportional to the instantaneous voltage value of the low-level, audio or other modulating signal applied to the system.

These unidirectional rectangular pulses of varying duration may be applied to a solid state device such as mentioned above: a power switching transistor, or to a semiconductor bridge. When an appropriate transducer is connected in an appropriate circuit portion of the solid-state device, switching transistor or semi-conductor bridge, a voltage, current, or power-variation corresponding to the originally applied low-level signal and applied to the transducer will result in the transduction from said voltage, current, or power variation to some other appropriate form of energy.

One application of the above described method and system is to the power amplification of audio-signals wherein the abovementioned low-level signal may be the output of a phonograph pickup, microphone, magnetic tape playback device or the like. In such an application, the triangular wave oscillation may be generated at 60 kilocycles per second. The low-level audio signal and 60 kc. triangular signal are both applied to a semi-conductor modulator which in turn is connected to a transistor or semi-conductor amplitude clipper and the output signal thereof applied to a power switching transistor which has connected therein a load device such as a loudspeaker.

Another application of the system and technique described hereinabove may be to motor driven devices where it is desirable to maintain the speed of a motor in synchronism with some external reference signal. In this application, the motor in its operation, or through its load elements provides a signal which is compared with the reference signal to develop an "error" signal. The "error" signal provides the low-level signal previously described. This and the reference signal, or a separate power frequency signal, modified to produce the triangular waves, preferred for use with this invention, are applied to the circuit configuration as briefly described above according to this invention, where the motor is the transducer or a load device.

It is to be noted here that in the absence of an "error" signal, or the modulating low-level audio signal previously described the load device or motor as in the latter exemplary application will be driven by a train of constant amplitude unidirectional rectangular pulses of uniform duration.

As applied to the above described motor control, the error signal would cause the pulse durations to vary in a direction to correct the "error."

Other applications may occur to those skilled in the art when reading the following specification.

Accordingly, it is an object of this invention to provide an improved and more efficient means of power amplification of low-level electrical signals by varying the base width of similar isosceles triangular waves by the low-level signals to develop thereby a pulse width modulated signal of constant amplitude for the excitation of solid state power conversion devices to drive transducers or load devices in accordance with the low-level signals.

It is a further object of this invention to provide a triangular wave oscillator the output of which is modulated to produce a train of similar triangular waves varying in amplitude in proportion to low level audio signals applied thereto, the resulting modulated waves being clipped to form a train of generally rectangular unidirectional pulses varying in duration according to the audio signals, the unidirectional rectangular pulses being applied to power switching transistors and other solid state devices to drive loudspeakers or other transducers.

It is another object of this invention to provide improved and more efficient power amplification by the modulation of the width of isosceles triangular waves with low level lower frequency signals to develop thereby a modulating current for the excitation of power translating devices to drive transducers or load devices in accordance with said lower frequency signals.

It is a still further object of this invention to provide a triangular wave oscillator, the output of which is modulated to produce triangular waves varying in amplitude in accordance with low level audio signals applied thereto, the resulting modulated waves being clipped to form generally rectangular waves of varying widths corresponding to said audio frequencies, said clipped waves varying in width being applied to transistor power switching devices to drive appropriate electroacoustic transducers.

It is yet another object of this invention to provide efficient audio amplification by means of driving power transistor switching devices with width modulated rectangular signals derived from relatively higher frequency isosceles triangular waves amplitude, modulated by low-level relatively lower frequency audio waves.

It is still another object of this invention to provide lightweight compact power amplifying systems employing devices which exploit the properties of isosceles triangular waves, square waves and their relation to the excitation of power switching transistor devices.

These and other objects will be more fully understood from the specification which follows and from the appended claims taken together with the accompanying drawings in which:

Figure 1:
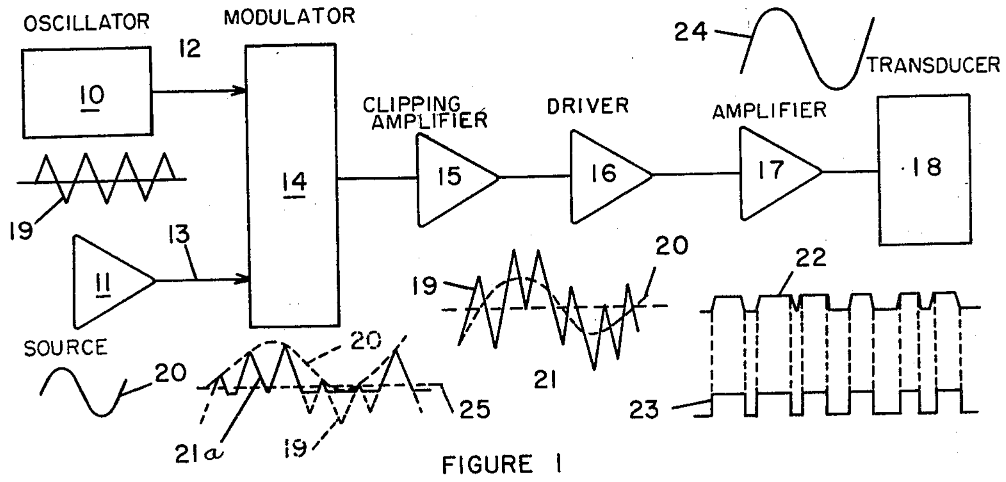
FIGURE 1 is a block diagram of the basic configuration of one embodiment of the power amplifying method and means according to this invention and the various waveforms of signals involved in the implementation thereof.

Referring now to FIGURE 1, there is shown a block diagram of an embodiment of this invention wherein a high frequency wave generator 10 provides a single frequency oscillation such as shown at 19. The oscillation 19 may be a triangular wave or a saw-toothed wave or a sine wave. The triangular wave 19, however, is to be preferred. A source 11 of low-level signals may provide a slowly varying direct current signal or audio frequency signals or any other information type of output, a representative form of which is shown at 20. Source 11 and generator 10 are both connected by their respective leads 13 and 12 to a modulating device 14 which may be a semi-conductor diode or other similar device and an appropriate circuit wherein half-wave unidirectional triangular pulses **21*a* are derived from oscillations 19 modified by wave 20, as a result of both signals 19 and 20 being applied to modulator 14 from their respective sources 10 and 11. The modulated signal is shown at 21. The resulting output signal of modulator 14 is shown by waveforms 21*a* and can be seen to represent a minimum amplitude of triangular wave for the high frequency signal 19 when the low-level signal 20** is at its maximum.

Thus, if wave 20 were the output of an audio device such as a microphone, a radio tuner, a phonograph pick-up or the like, the waveform of the resulting signal **21*a* at the output of modulator 14 would appear as shown at 21*a***.

These signals such as **21*a* are applied to a clipping amplifier 15 which in turn is connected to a driver amplifier 16. The amplifier 16 applies the clipped signal 23 to a power switching device 17 which is connected to a transducer 18. The signal 23 represents the fact that for a low amplitude of unidirectional triangular wave in 22 a narrow rectangular pulse results whereas for a high amplitude of triangular wave in 22 the rectangular pulse in 23** is broad.

It is to be noted here that the signals 19 and 20 applied to modulator 14 combine therein to produce the signal 21, the lower half of which is by-passed as shown in **21*a* by virtue of the rectifying action of modulator 14 as further described below. It may be seen that the composite signal 21 is in fact the low-level, low frequency signal with the high-frequency signal 19** superimposed thereon.

Modulator 14 is connected to clipping amplifier 15 and amplifier 15 is connected to driver amplifier 16. Amplifier 15 is a class "C" amplifier and so will amplify only those portions of wave 21*a* which exceed an initial bias. Amplifier 16 produces an output signal 23. Switch amplifier 17 is connected to amplifier 16 and is driven by the signal wavetrain such as 23. Switching amplifier 17 is connected to a load device 18 which may be a transducer such as a loudspeaker, a motor or any other such device.

Driver amplifier 16 as well as clipper amplifier 15 are operated so as to saturate; the driver amplifier 16 may saturate at a higher level than clipper 15 so that the output signal waveform from amplifier 16 is as shown at 23. It may be seen that signal 23 is a series of rectangular pulses of varying width but constant amplitude. The variations in width correspond to the instantaneous amplitude of the low-level signal 20, originally applied. The repetition frequency of the pulse corresponds to the frequency of original wave 19 generated by oscillator 10. Output signal 23 from driver 16 is applied to transistor switching amplifier 17 which is in turn connected to transducer 18. Signal 23 applied to switching amplifier 17 causes amplifier 17 to vary in its operating current correspondingly to the variations in the original signal so applied to the system. At 24, the waveform of the output signal which drives transducer 18 is shown. Signal 24 is of considerable power and capable of driving a transducer such as 18 which requires considerable power.

Figure 2:
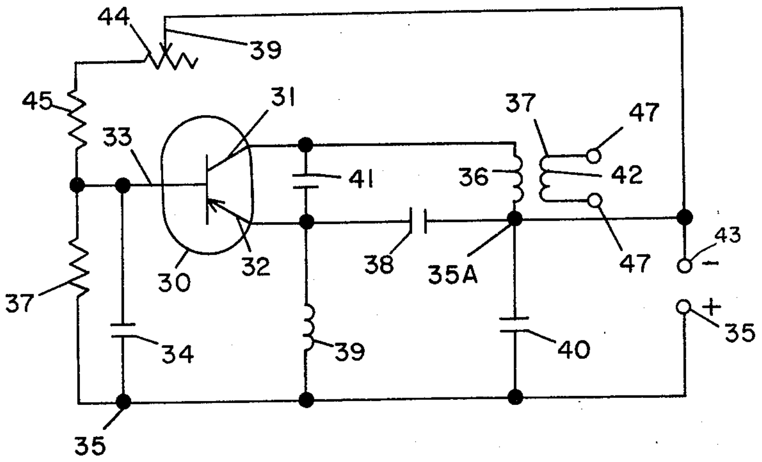
FIGURE 2 is a circuit diagram of a conventional high frequency oscillator configuration.

In FIGURE 2, a conventional transistor oscillator is shown in which a transistor 30 has a base 33, an emitter 32 and a collector 31. From base 33, a resistor 37 and a capacitor 34, connected in parallel are connected to a reference potential point 35 which is common with the positive terminal of a power source for the transistor oscillator connected between 35 and 43. A fixed resistor 45 and a rheostat 44 are connected in series. The variable arm of rheostat 44 is shown at 39. Variable arm 39 is connected to negative potential point 43. Resistor 45 is connected to base 33 of transistor 30. A capacitor 41 is connected between collector 31 and emitter 32 of transistor 30.

A coil 36 is connected from collector 31 to negative potential point 43. Capacitor 41 previously mentioned and a capacitor 38 connected across coil 36 as a series combination forms the voltage divider for feedback, the junction thereof connecting to emitter 32 and one side of an R–F choke 39 connected between emitter 32 and reference potential connection 35. Coil 36 has a secondary winding 42 connecting to output terminals 47. A filter capacitor 40 is connected across the power terminals 43 and 35.

The oscillator circuit formed in FIGURE 2 is of the Colpitts type and produces generally sinusoidal waves. It is a conventional oscillator of this type.

Figure 3:
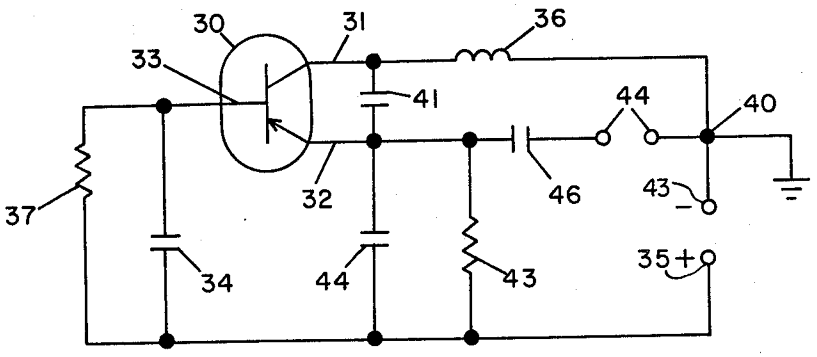
FIGURE 3 is a modification of the conventional circuit as used in this invention.

To generate the triangular waves preferred for use with this invention, the Colpitts oscillator of FIGURE 2 has been simplified and modified as shown in FIGURE 3. The elements of the oscillator shown in FIGURE 3 which correspond to similar elements shown in FIGURE 2 are identified by the same reference numerals.

Referring now to FIGURE 3, transistor 30 has the same base 33 as in FIGURE 2. Base 33 is connected to biasing network formed by resistor 37 and capacitor 34 connected in parallel between base 33 and reference potential point 35. Coil 36 is connected between collector 31 and negative potential point 43. From emitter 32, capacitor 44 in parallel with resistor 43 are connected to reference potential point 35. A capacitor 46 couples emitter 32 to output terminal 49. The other output terminal 52 is connected to negative potential point 43 which may be grounded.

It may be noted here that the oscillator of FIGURE 3 is formed by the elimination of resistors 45 and 44, R-F choke 39, and capacitors 38 and 40 from the oscillator shown in FIGURE 2.

The operation of the oscillator in FIGURE 3 is predicated on the functioning of capacitors 34 and 41 as the capacitive divider for the feedback current. Capacitor 41 and coil 36 function as the tuned tank circuit for the oscillator. Resistor 43 is the output load resistor and capacitor 46 the output coupling capacitor.

Figure 4:
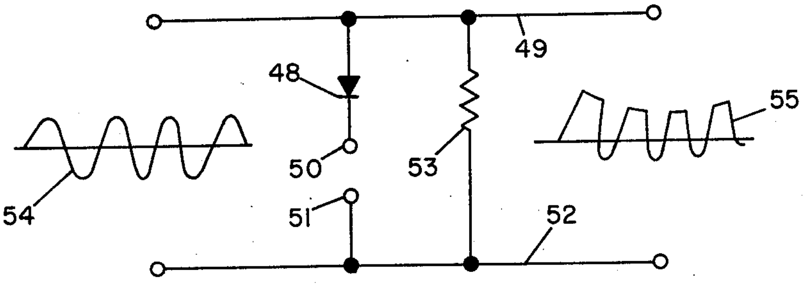
FIGURE 4 is one form of modulator device which may be employed in the invention.

The circuit of FIGURE 4 to which reference is now made is that of a shunt clamping circuit wherein if an alternating signal such as shown at 54 is applied to the input terminals 49, 52, thereof, the signal will be "clamped" as shown at 55. The circuit of FIGURE 4 comprises a diode 48 having an anode connected to input 49 and cathode connected to a terminal 50 which as further explained below would be connected to a source of low level signals. The return circuit of the low level signal source at 51 being connected to return end 52 of the clamp circuit. Resistor 53 connected across terminals 49, 52 are a combined input-output load resistor for the clamping circuit.

When a low-level signal is applied to the shunt clamping circuit at 50, 51, the clamping level of the clamping circuit will vary in accordance with the low level signal applied. This is what causes the dip in clamping level of the waveform 55.

Figure 5:
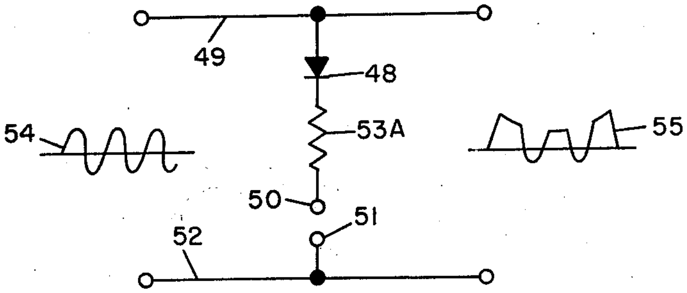
FIGURE 5 is another form of modulator which may be employed in the invention.

In FIGURE 5, a series clamping circuit is shown having the same circuit components as in FIGURE 4 but arranged so that diode 48 load resistor 53 and low-level input terminals 50, 51 are in series across leads 49, 52.

Figure 6:
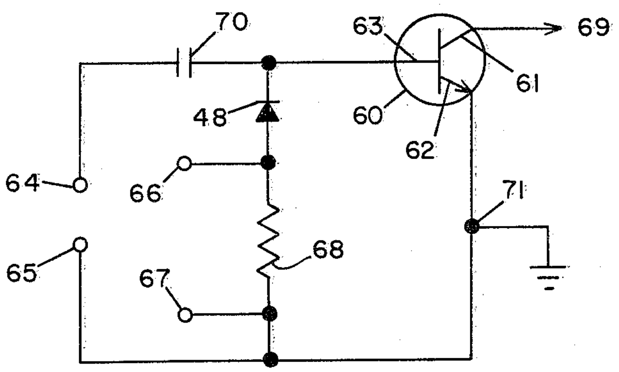
FIGURE 6 is a further modification of a modulator circuit according to this invention including a representative output device.

In FIGURE 6, there is shown a modification of the clamping circuits above-described arranged so that at one and the same time modulating of the signals applied occurs and clamping of the resultant modulated signal as further described below.

In FIGURE 6, a transistor 60 is shown having a base 63, an emitter 62 and a collector 61. An input coupling capacitor 70 is connected between an input terminal 64 and base 63. A diode 48 in series with a resistor 68 is connected between base 63 and a return terminal 65 which may be grounded as at 71. Across resistor 68 terminals 66 and 67 may be connected. The emitter 62 of transistor 60 is grounded at 71, the collector 61 is connected to a utilization circuit at 69.

Figure 7:
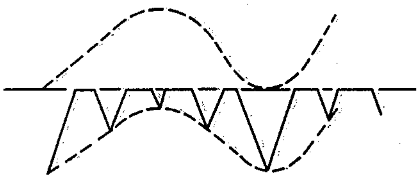
FIGURE 7 shows the waveforms of current in the diodes of the modulator circuits of FIGURE 6.

In operation, the modulating clamp circuit performs as follows: at terminals 64 and 65 the triangular wave such as 19 (FIGURE 1) may be applied. At terminals 66, 67 the low level signal such as 20 (FIGURE 1) may be applied. The resulting modulating action causes a signal such as 21 to be generated but by the action of diode 48 (FIGURE 6) there appears at base 63 of transistor 60 the signal 21*a*. Signal 21*a* may be seen to be only those portions of signal 21 which are positive going since the negative half signals are conducted across diode 48 and resistor 68. This action results from the presence of signal 20 at terminal 66 varying the bias on diode 48 so that the D.-C. level of base 63 varies and the resultant collector current varies accordingly. The current through diode 48 is shown in FIGURE 7. The base current signal is shown in FIGURE 8.

Figure 9:
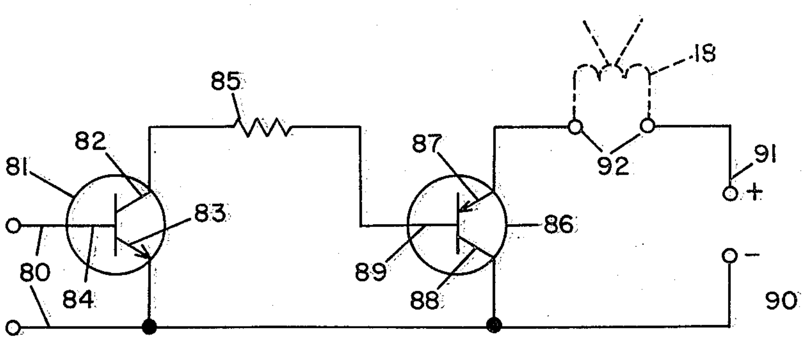
FIGURE 9 is a circuit diagram of a representative driver and power output stage as employed in this invention.

Signal 21*a* is applied to an amplitude clipping circuit and driver such as shown in FIGURE 9, wherein a transistor 81 with base 84, emitter 83 and collector 82 acts as an amplitude limiter. Collector 82 is D.-C. coupled through resistor 85 to the base 89 of a power transistor 86. The emitter 87 of transistor 86 goes to terminals 92 to which a load device may be connected. The collector 88 of transistor 86 is connected to a negative potential point. The return end of output terminals 92 is connected to a positive potential point. It is to be noted that transistors 81 and 86 are of opposite conductivity types. A source of D.-C. power is connected to terminals 90 and 91 polarized as shown.

Figure 8:
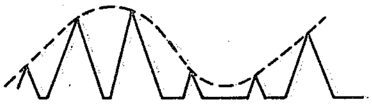
FIGURE 8 shows the waveforms of current in the base of the output device of FIGURE 6.

When a load device is connected at terminals 92 and D.-C. power applied at terminals 90–91, and when signal of FIGURE 8 or 21*a* is applied at terminals 80 of transistor 81, the collector current of transistor 80 appears as shown at 22.

Figure 10:
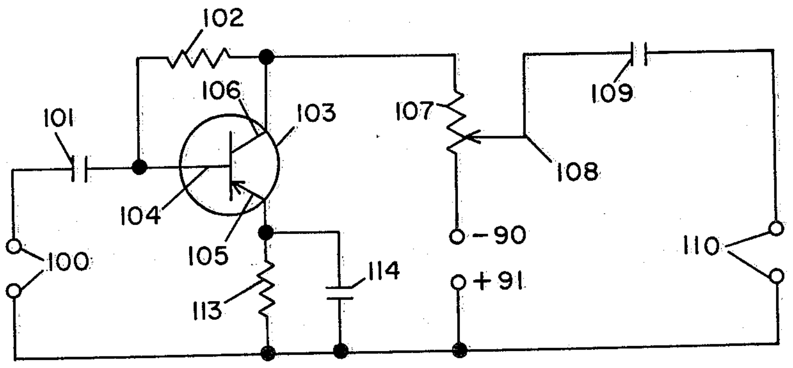
FIGURE 10 is a circuit diagram of a representative preamplifier stage as used in this invention.

In FIGURE 10, a typical preamplifier is shown which is of the kind usable for this invention preceding the modulator stage shown in FIGURE 6. The circuit of FIGURE 10 includes input terminals 100 designed to be coupled to a source of low level audio signals and through capacitor 101 to the base 104 of a transistor 103. Resistor 102 connected from base 104 to the collector 106 of transistor 103 provides base bias potential. Emitter 105 of transistor 103 has a bias resistor 113 and by pass capacitor 114 connected between it and positive terminal 91. An output gain control 107 is connected between collector 106 and negative potential terminal 90 as are output load device. From the variable arm 108 of control 107 a capacitor 109 couples the signal to output terminals 110. The circuit of FIGURE 10 is a conventional transistor amplifier circuit.

Figure 11:
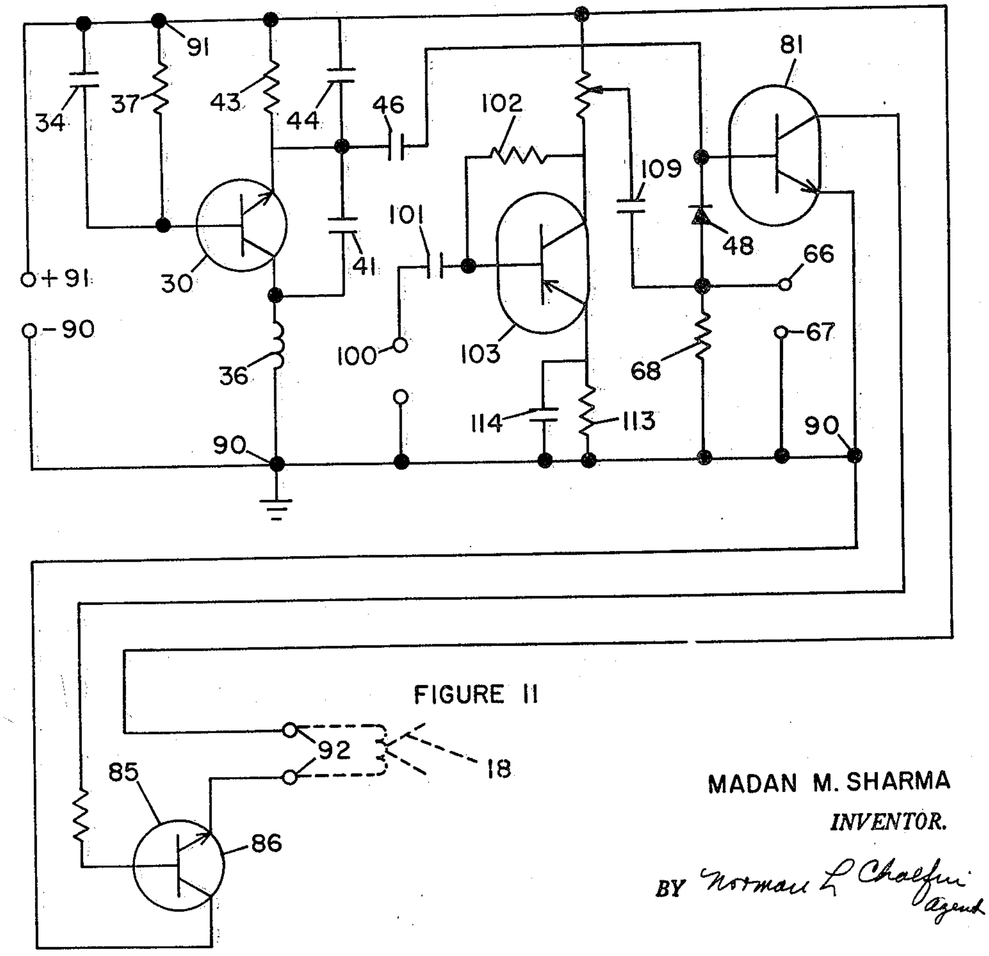
FIGURE 11 is an overall circuit diagram embodying several of the circuit elements shown in the other figures and generally following the block diagram of FIGURE 1 to show application of the new technique, according to this invention.

In FIGURE 11, the oscillator of FIGURE 3, the modulator of FIGURE 6, the preamplifier of FIGURE 10, and the clipper and output stage of FIGURE 9 have been combined to show an implementation of the invention according to FIGURE 1. All of the circuits coupled together in FIGURE 11 correspond to the block diagram of FIGURE 1. The reference characters of the circuit elements in FIGURE 11 correspond to their respective individual circuit reference designations in the FIGURES 3, 6, 9, or 10 wherever shown.

The overall operation of the embodiment of this invention shown in FIGURE 11 can be seen to be as follows: D.-C. battery power poled as shown at 91, 90 is connected to the circuit. This may be battery or solar power sources or even a thermoelectric generator. Transistor 30 and its associated circuits generate a triangular waveform such as 19 in FIGURE 1. The frequency of this wave is determined by the values of coil 36 and capacitor 41 forming essentially a series tuned circuit. Through capacitor 46 the triangular oscillation at a frequency (which may be in the neighborhood or 60 kc, for example) is applied to modulator diode 48 and driver transistor 81. A low level signal such as 20 of FIGURE 1 which may be an audio signal a variable D.-C. current of slow rate of changes is applied to terminals 100, amplified by preamplifier transistor 103, and coupled by capacitor 109 to diode series load resistor 68 resulting in the modulating and clamping of signals 19 and 20 to derive signal 21*a* shown in FIGURE 1 and also in FIGURE 8. Signal 21*a* appears at the base of transistor 81 which saturates at a low input signal level so that at the collector of transistor 81 the signal shown at 22 or at 23 appears. As previously explained, signal 23 is a unidirectional constant-amplitude variable-pulse-width signal which when applied to a switching transistor causes the average load current thereof to vary as the pulse durations vary. These pulse durations correspond to the low-level input signals in their variation and thus result in an average current variation in the switching transistor load which may be connected to terminals 92 corresponding to the low level signals. The invention may be used for audio power amplification in which case audio signals are applied at 100, and the load device at 92 would be a loudspeaker. The circuit of transistor 86 may be modified to incorporate a single-ended push-pull or bridge transistor output configuration so as to isolate the D.-C. current in the loudspeaker load that it may have a proper quiescent position for best reproduction fidelity.

The invention may also be used to drive motors in servomechanisms where the motor is the load device and the error sensing signal is that which is applied to terminals 100. The error signal causes the motor to advance or retard as necessary to follow its command signals.

A variable frequency power source is another application for this invention for use with vibration generators. A variable frequency low-level oscillator would be connected at 100 in FIGURE 11 and the load device at 92 would be a "shake table."

To indicate the compactness of equipment constructed with the invention, a high-powered (10 w.) amplifier was built on a 1¼ x 3" x 4½" assembly—not much larger than a cigarette pack.

A further advantage of the invention is found in the fact that the switching power transistor such as 17 is operated in the switching mode with such rapidity for each cycle that no oportunity is presented for heat generation great enough to harm transistors. Considerably more power output is thus possible without additional heat dissipation.

Other applications of this invention are certain to occur to those skilled in the art to which it can be applied within the ambit of the following claims.

What is claimed as new is:

1. A power amplifying system for low level audio signals comprising: a generator of relatively high frequency waves at a fixed frequency, said waves havng sloping leading and trailing edges; a source of audio signals at low level and varying in frequency; a modulator connected to said source and to said generator and having circuits therein adapted to be responsive to said audio signals to vary the amplitudes of said relatively high frequency waves and to produce unidirectional pulses at said fixed frequency varying in amplitude in accordance with the instantaneous values of said audio signals; an amplitude limiting circuit connected to said modulator and responsive to said uni-directional pulses produced thereby to develop uni-directional rectangular pulses of constant amplitude and varying durations, the variations in duration of said rectangular pulses being proportional to the variations in amplitude of said uni-directional pulses from said modulator; and a power switching amplifier connected to said amplitude limiting circuit and adapted to respond to said uni-directional rectangular pulses of variable duration to vary the average current in said power switching amplifier in accordance with said variations in duration.

2. A power amplifying system according to claim 1, in which said relatively high frequency waves are triangular in shape and whereby said uni-directional pulses are also triangular in shape.

References Cited in the file of this patent

UNITED STATES PATENTS

| | | |
|---|---|---|
| 2,438,927 | Labin et al. | Apr. 6, 1948 |
| 2,441,418 | Houghton | May 11, 1948 |
| 2,556,457 | Watts | June 12, 1951 |
| 2,566,826 | Day | Sept. 4, 1951 |
| 2,864,905 | Grantges et al. | Dec. 16, 1958 |
| 2,868,877 | Hooper et al. | Jan. 13, 1959 |
| 2,990,452 | Harrison et al. | June 27, 1961 |
| 3,003,122 | Gerhard | Oct. 3, 1961 |